United States Patent [19]

Audhe et al.

[11] Patent Number: 5,209,773

[45] Date of Patent: May 11, 1993

[54] DUAL FUNCTION MERCURY TRAP/PARTICULATE FILTER BEDS

[75] Inventors: Costandi A. Audhe, Princeton; Gray W. Kirker, Sewell, both of N.J.

[73] Assignee: Mobil Oil Corporation, Fairfax, Va.

[21] Appl. No.: 802,173

[22] Filed: Dec. 4, 1991

[51] Int. Cl.[5] .............................................. C22B 43/00
[52] U.S. Cl. ...................................................... 75/388
[58] Field of Search ........................................... 75/388

[56] References Cited

U.S. PATENT DOCUMENTS

| | | | |
|---|---|---|---|
| 4,094,777 | 6/1978 | Sugier et al. | 210/32 |
| 4,230,486 | 10/1980 | Capunao | 75/388 |
| 4,251,495 | 2/1981 | Deschamps et al. | 423/230 |
| 4,728,400 | 3/1988 | Ferro | 75/388 |
| 4,834,953 | 5/1989 | Audeh | 423/210 |
| 4,874,525 | 10/1989 | Markovs | 210/673 |
| 4,895,708 | 1/1990 | Yan | 423/210 |
| 4,902,662 | 2/1990 | Toulhoat et al. | 502/216 |
| 4,981,577 | 1/1991 | Audeh et al. | 208/251 |
| 4,982,050 | 1/1991 | Gammie et al. | 585/818 |
| 4,983,277 | 1/1991 | Audeh et al. | 208/252 |

Primary Examiner—Peter D. Rosenberg
Attorney, Agent, or Firm—Alexander J. McKillop; Charles J. Speciale

[57] ABSTRACT

A method and guardbed useful for the removal of residual amounts of mercury and entrained particulate matter from a gas such as a natural gas stream are disclosed. The guardbed contains at least two different particle size porous substrates impregnated with mercury amalgamable materials. In one embodiment, the porous substrates are arranged so that the larger substrates are disposed in the entrance region of the guardbed. In operation, a gas stream is passed over and through the porous substrates so that entrained particulate matter is trapped within the guardbed while mercury present in the gas stream is removed by amalgamation.

17 Claims, 2 Drawing Sheets

DUAL FUNCTION MERCURY TRAP/PARTICULATE FILTER BEDS

BACKGROUND OF THE INVENTION

The present invention is directed to a method and apparatus for removing contaminants from gases. Specifically, the present invention is directed to a process for removing mercury and entrained particulate matter from gases prior to liquefaction and a novel guardbed for practicing that process. The present invention is particularly useful as a means for removing particulate matter and residual amounts of mercury from a natural gas stream prior to liquefaction.

Natural gas produced from natural gas wells is usually separated and purified over several steps to provide products for a variety of end uses, see FIG. 1. The natural gas well stream exiting the well is a high-pressure mixture and is typically sent to a separator vessel or series of separator vessels maintained at progressively lower pressures where it is separated into a gaseous fraction and a liquid fraction.

The gaseous fraction leaving the separator is then directed to a gas treatment and purification plant where impurities such as hydrogen sulfide, carbon dioxide and mercury are significantly reduced from the stream. At this stage, the mercury concentration is normally reduced to levels of less than 0.1 micrograms/Nm$^3$, the hydrogen sulfide concentration is reduced to about one (1) part per million and the carbon dioxide level is reduced to the parts per million (ppm) level.

The gaseous fraction may be purified by passing it over a bed of activated carbon which has been impregnated with sulfur. The gas reacts with the sulfur and the mercury content of the gas can be reduced from about 250 $\mu$g/Nm$^3$ or higher to levels approaching 0.1 $\mu$g/Nm$^3$.

The gas may be further purified by treating the gas with a hot aqueous potassium carbonate solution to reduce the carbon dioxide and hydrogen sulfide content of the stream. For example, the carbon dioxide of the gas can be reduced from about 15% to about 0.3% and the hydrogen sulfide content of the gas from about 80 ppm to about 6 ppm.

Still further purification of the natural gas stream treated with the carbonate solution may be desirable. Further treatment to reduce the amount of carbon dioxide and hydrogen sulfide in the gas may be achieved by treating the gas with an amine solution such as an aqueous solution of diethanolamine. Diethanolamine has the ability to absorb carbon dioxide and hydrogen sulfide and can reduce the carbon dioxide content of the gas from about 0.3% to about 50 ppm and the hydrogen sulfide content from about 6 ppm to about 1 ppm. The natural gas is then washed with water to remove traces of the entrained absorptive amine solution.

The washed natural gas is water-saturated and has to be dried prior to liquefaction. Usually, drying is achieved by contacting the wet gas with a desiccant in a packed bed specifically designed for this purpose. The desiccants found o in the drying beds used in LNG plants may include any solids which have the ability to absorb water and release it upon heating to regenerate the desiccant and have the ability to withstand the regeneration temperatures of from about 400° to about 700° F. Examples of the desiccants include alumina, silica, silica-alumina, molecular sieves, silica gels and combinations thereof. The desiccant bed undergoes repeated cycles of absorption and regeneration. To ensure that the desiccant bed retains its integrity during the drying and regeneration cycles, a protective layer containing, for example, inert alumina spheres having a depth of about 0.5 to about 2 feet may be placed over the desiccant.

The high pressure of the gas stream contacting the desiccant bed and the repeated cycles of adsorption and regeneration eventually take a toll on the drying bed. Fragments of the desiccant materials and/or protective layer materials can break away and be carried downstream, ultimately having a negative effect on the liquefaction process.

Separately, in spite of the above-described purification steps, residual amounts of mercury may remain in the gas stream in amounts of about 0.1 $\mu$g/Nm$^3$. The processing of natural gas in LNG plants requires that the gas contact processing equipment made primarily of aluminum. This is particularly true during the liquefaction steps where the gas is cooled in aluminum heat exchangers. Under certain process conditions, the residual amounts of mercury present in the gas stream can amalgamate with aluminum. This amalgamation is cumulative and can cause severe corrosion which results in operational problems. Further, since aluminum heat exchangers represent a capital investment of several million dollars, damage to these exchangers is to be avoided if at all possible. Damage such as corrosion cracking of the heat exchangers can lead to equipment failure. Repair to the system is often difficult because the amalgamation may effect the welded seams of the aluminum materials.

Guardbeds which are designed to protect downstream liquefaction apparatus by removing the residual Hg from the gas stream, trap entrained particulate matter. These guardbeds, however, can become clogged with the entrapment of the particulate matter. Such clogging usually causes a pressure drop in the system and tends to reduce production efficiency.

In view of the foregoing, improving natural gas processing methods and apparatus is desirable. In particular, it would be beneficial to provide a mechanism for protecting the liquefaction equipment by reducing the levels of residual mercury from the gas prior to it entering the liquefaction equipment while at the same time providing a mercury removal bed which has a long, stable life cycle. This is achieved by providing both a mercury removal function and improved resistance to pressure drop build up within the bed caused by entrained particulate matter.

It is, therefore, an object of the present invention to provide an improved method and apparatus for removing contaminants such as residual amounts of mercury and entrained particulate matter from a gas stream in order to preserve the integrity of liquefaction apparatus such as aluminum heat exchangers and maintain high throughput.

It is a further object of the present invention to remove the above-described contaminants from the gas without incurring an unacceptable pressure loss in the system.

SUMMARY OF THE INVENTION

In accordance with the present invention, there is provided an improved guardbed useful in the processing of a gas such as natural gas and a method of removing mercury and entrained particulate matter from the gas stream.

The guardbed may be arranged as a container having an entrance region and an exit region. The guardbed includes at least two porous substrates, each being a mercury amalgamable material or, in general, a material that has the ability to remove Hg and the second porous substrate has a particle size smaller than that of the first. The first porous substrate is preferably disposed in the area of the entrance region. Thus, gas containing mercury and entrained particulate matter can be passed through the guardbed for removal of mercury while the entrained particulate matter can be separated from the gas and trapped.

The mercury amalgamable materials may be silver, gold, or mixtures thereof. The first porous substrate may have a particle size diameter of about ⅜" to ¼", preferably about ½" to ¼", and most preferably about ¼" to ⅜". The second porous substrate will have a particle size diameter smaller than that selected for the first porous substrate, about ⅜" to 1/32", and most preferably about ¼" to 1/16". The first and second porous substrates may be independently selected from alumina, silica-alumina, silica gels, molecular sieves, activated carbon, impregnated activated carbon and mixtures thereof.

In an alternative embodiment, there is provided a process for the simultaneous removal of mercury and entrained particulate matter from a gas. The process includes forming a guardbed as described above and contacting a gas containing the above-described contaminants with the guardbed at a pressure and temperature sufficient to reduce the level of mercury and entrained particulate matter from the gas. In a preferred embodiment, the gas has been dehydrated prior to contacting the guardbed. The gas contacts the guardbed at pressures of about 1 to 100 atmospheres, preferably about 30 to 70 atmospheres, and most preferably about 40 to 55 atmospheres. The temperature at which the gas contacts the guardbed ranges from 50° to 120° F., preferably about 65° to 85° F., and most preferably about 70° to 75° F.

As a result of the present invention protection of liquefaction apparatus is significantly improved. Contaminants such as residual amounts of mercury and entrained particulate matter can be substantially removed from a natural gas stream. Further, the guardbed and method of the present invention protect expensive liquefaction apparatus without incurring an unacceptable pressure loss in the system which, heretofore, had been difficult to avoid because of the necessary apparatus placed in the processing stream.

For a better understanding of the present invention, together with other and further objects, reference is made to the following description, taken together with the accompanying drawings, and its scope will be pointed out in the appended claims.

DETAILED DESCRIPTION OF THE INVENTION

The guardbed of the present invention is arranged as a container having an entrance region and an exit region. The entrance region is adapted to receive an oncoming gaseous stream and the exit region directs the gas stream to further gas processing apparatus after treatment to remove mercury and entrained particulate matter. The guardbed includes at least two porous substrates having mercury amalgamable materials impregnated therein or, in general, materials that have the ability to remove Hg. The substrates are of at least two particle sizes and preferably arranged so that the first porous substrate disposed in the area of the entrance region of the container. The second porous substrate has a particle size which is smaller than that of the first porous substrate.

The mercury amalgamable materials found in the porous substrates may be silver, gold or mixtures thereof. The mercury present in the gas stream becomes an amalgam with the silver and/or gold impregnated in or coated on the porous substrates. The amalgamated mercury may thereafter be recovered from the guardbed by known recycling methods.

Any known method for impregnating or coating the first and second porous substrates with the mercury amalgamable materials may be utilized. For example, silver impregnated alumina pellets may be prepared by thoroughly mixing 1000 parts by weight of alumina (dry basis) with 1 part silver derived from a silver salt and 100 parts deionized water. The mixture is then extruded through a quarter inch die plate and dried at a temperature of about 120° C. Similarly, gold impregnated porous substrates may be prepared by mixing 1000 parts by weight alumina (dry basis) with 1 part gold derived from gold salts and 100 parts of deionized water. The mixture is then extruded and dried as set forth above. The present invention is not limited by the manner in which the mercury amalgamable materials are impregnated or coated onto the porous substrates.

When silver is added to a porous substrate, it is preferably added in an amount of from about 0.1 to about 10% by weight of the substrate, and most preferably from about 1 to about 5%. Similarly, gold is preferably added in an amount of from about 0.1 to about 10% by weight based on the weight of the substrate, and most preferably in an amount of from about 3 to about 5% by weight.

Suitable porous substrates include alumina, silica-alumina, silica gel, molecular sieves and other porous substrates known in the art. Those skilled in the art will also appreciate that certain porous substrates also provide the added advantage of being able to absorb some moisture from the gas stream thereby supplementing the dehydration performed by any desiccant further upstream.

Figure 1:
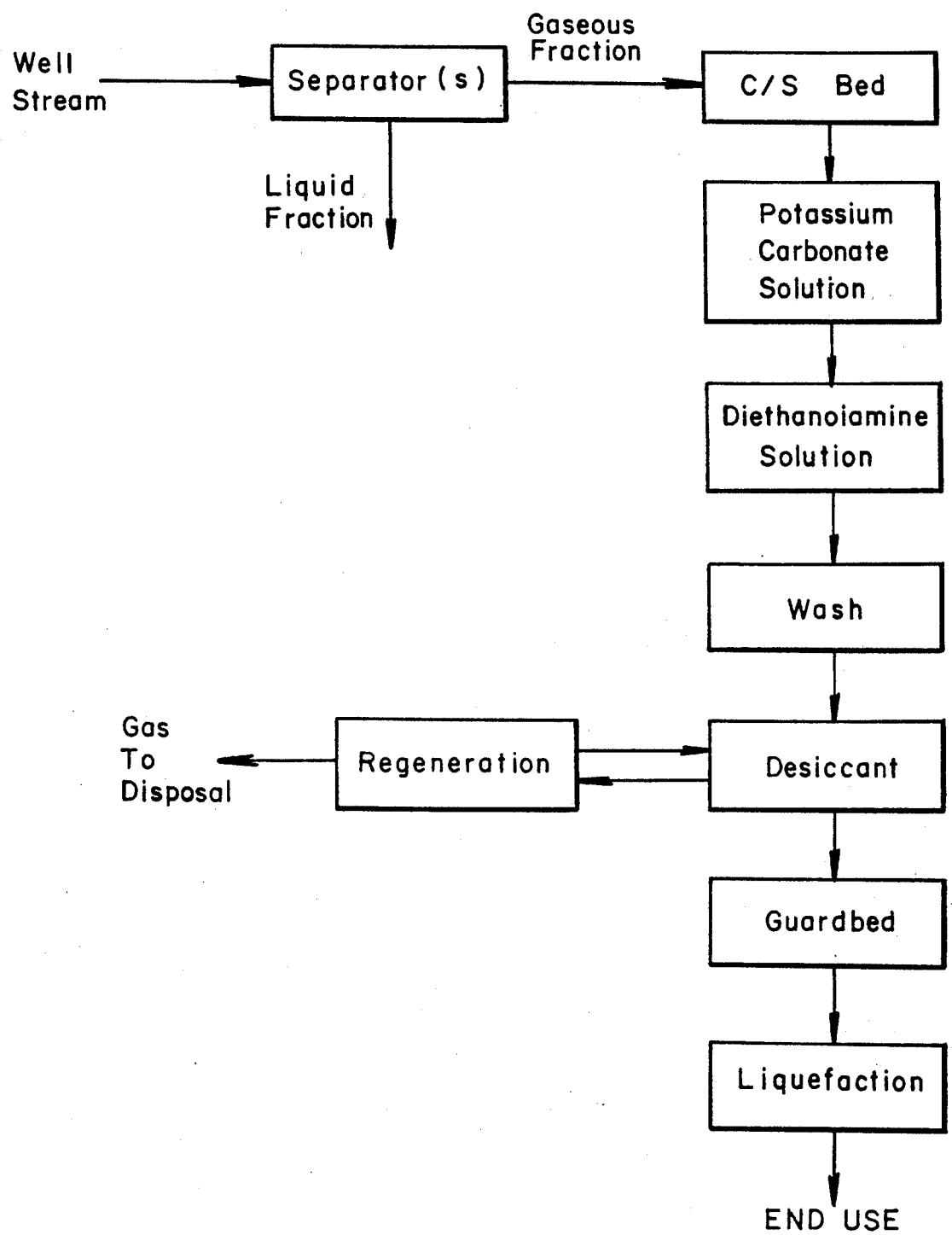
FIG. 1 generally illustrates a prior art process for the separation and treatment of natural gas into its component parts.
Figure 2:
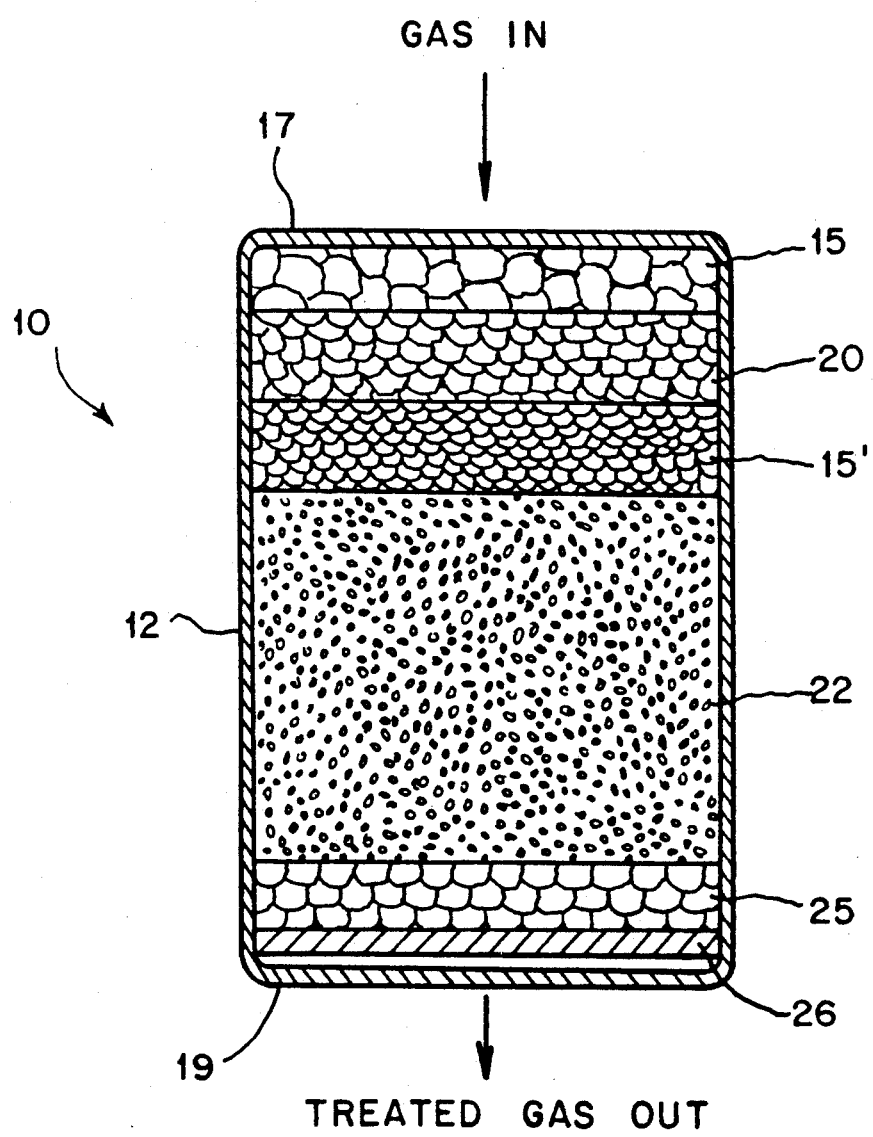
FIG. 2 is a schematic side view of a guardbed prepared in accordance with the present invention.

Referring to FIG. 2, there is schematically shown one embodiment of the present invention. A guardbed 10 is shown having an entrance region 17 and an exit region 19. A protective layer 15 of inert ceramic and/or alumina pellets or spheres is shown placed in the area of the entrance region 17 of the guardbed container 12. A second protective layer 15' is shown separating the first porous substrate 20 and the second porous substrate 22. A support zone 25 may also be disposed in the area of the exit region 19 resting on a support grid 26. The protective and support layers assist in maintaining the guardbed integrity especially when the gas stream is in contact with the guardbed, typically at temperatures, for example, of about 70° F. to 75° F., and pressures of about 40 to 55 atmospheres.

The first and second porous substrates may be independently selected from the group consisting of alumina, silica-alumina, silica gels, molecular sieves, activated carbon, impregnated activated carbon and mixtures thereof. While the above materials are preferred, it is understood that the porous substrates may also comprise any solids which may be impregnated or coated with mercury separating materials such as by amalgamation or reaction and withstand the processing temperatures and pressures described herein. The shape of the first and second porous substrates may be in the form of pellets, spheres, tablets or an extrudate.

The ability of the guardbed 10 to remove entrained particulate matter from the gas stream is enhanced, at least in part, to the arrangement of the first and second porous substrates in the container. In a preferred embodiment, the first porous substrate 20 is spherically shaped and found chiefly in the area of the entrance region 17. The first porous substrate spheres have a particle size diameter of about ¾" to ⅛", preferably about ½" to ¼", and most preferably about ⅛" to ⅜". The second porous substrate 22 is also preferably spherically shaped and has a particle size diameter smaller than that of the first porous substrate, preferably about 25% to about 90% smaller. For example, the spheres may have a particle size diameter of about ⅜" to 1/32" and preferably about ⅛" to 1/16". Alternatively, the guardbed of the present invention may include a layer of the second porous substrate disposed in the entranced region and the first and second substrates are placed below. In practice, both the first and second substrates may be present in the guardbed container in amounts sufficient to provide layers of from about 0.5 to about 2 feet in depth.

In a preferred operation, a gas stream flows through the guardbed, contacting the first porous substrate, flowing around and over the substrate, then, on its way to the exit region 19, around and over the second treated substrate which has a smaller particle size. The swirling action of the gas over and through the porous substrates initiates a chain of two events. First, the entrained particulate matter becomes lodged in the spaces surrounding the first and/or second porous substrate as the gas stream is forced through the guardbed. Second, as the gas stream contacts the first and second porous substrates impregnated with a mercury amalgamable material, the mercury present in the gas stream is reduced by amalgamation. The arrangement of the porous substrate spheres or pellets allows a substantial surface area over which the entrained particulate matter may be removed from the gas stream. Moreover, the arrangement of these spheres allows a myriad of paths for the gas stream to flow toward the exit region 19.

The present invention advantageously operates successfully over a range of temperatures and pressures. Moreover, the present invention does not require substantial changes to a conventional gas treatment process. The gas stream entering the guardbed will typically have a pressure of from about 1 to about 100 atmospheres, and preferably from about 20 to about 60 atmospheres. The gas stream will also have a temperature of from about 50° to about 120° F., and preferably a temperature of from about 70° to about 75° F. Finally, the gas stream entering the guardbed of the present invention will typically have a space velocity of from about 1 to about 300, and preferably 100 to about 200. Those skilled in the art will appreciate that the space velocity is defined as the volume of gas passing through the guardbed every hour divided by the volume of the guardbed. As used herein, the volume of the guardbed is considered to be the total volume of porous substrates.

The present invention is preferably used in a natural gas purification plant. It may, however, also be utilized in the treatment of other gases such as hydrogen, ethylene, etc., which may require removal of mercury and/or other entrained particulate matter.

While there have been described what are presently believed to be the preferred embodiments of this invention, those skilled in the art will realize that changes and modifications may be made thereto without departing from the spirit of the invention, and it is intended to claim all such changes and modifications as fall within the true scope of the invention.

What is claimed is:

1. A process for the simultaneous removal of mercury and entrained particulate matter from a gas, comprising:
   providing a guardbed comprising a container having an entrance region and an exit region, a first porous substrate impregnated with a mercury amalgamable material disposed in the area of said entrance region, a second porous substrate having a particle size less than that of said first porous substrate and impregnated with a mercury amalgamable material, and
   contacting said gas with said guardbed at a pressure and temperature sufficient to reduce the level of mercury and entrained particulate matter from said gas.

2. A process according to claim 1, wherein said gas is dehydrated prior to entering said guardbed.

3. A process according to claim 2, wherein said mercury amalgamable material is selected from the group consisting of silver, gold, and mixtures thereof.

4. A process according to claim 3, wherein the particle size of said first porous substrate is about ¾ to ⅛ of an inch in diameter.

5. A process according to claim 4, wherein the particle size of said first porous substrate is about ½ to ¼ of an inch in diameter.

6. A process according to claim 5, wherein the particle size of said first porous substrate is about ⅜ to 1/16 of an inch in diameter.

7. A process according to claim 6, wherein the particle size of said second porous substrate is about ⅜ to 1/32 of an inch in diameter.

8. A process according to claim 7, wherein the particle size of said second porous substrate is about ⅛ to 1/16 of an inch in diameter.

9. A process according to claim 8, wherein said first and said second porous substrates are independently selected from the group consisting of alumina, silica, silica-alumina, molecular sieves, silica gels, activated carbon, impregnated activated carbon and mixtures thereof.

10. A process according to claim 8, wherein said gas contacts said guardbed at a pressure of about 1 to 100 atmospheres.

11. A process according to claim 10, wherein said gas contacts said guardbed at a pressure of about 30 to 70 atmospheres.

12. A process according to claim 11, wherein said gas contacts said guardbed at a pressure is about 40 to 55 atmospheres.

13. A process according to claim 12, wherein said gas contacts said guardbed at a temperature of about 50° to 120° F.

14. A process according to claim 13, wherein said gas contacts said guardbed at a temperature of about 65° to 85° F.

15. A process according to claim 14, wherein said gas contacts said guardbed at a temperature of about 70° to 75° F.

16. A method for simultaneously removing contaminants from a natural gas stream comprising:

contact a mercury and contaminant particulate containing natural gas stream with at least two porous substrates arranged in series in a single contaminant vessel, each said substrate being a mercury amalgamable particulate, the particulate size of the first substrate being greater than the particulate size of the second substrate, under temperature and pressure conditions whereby said mercury amalgamates with said porous substrates and said contaminant particulate is lodged in said substrates continuously in the absence of unacceptable pressure loss in said stream as it passes through said contaminant vessel.

17. The method according to claim 16, wherein said substrates are spherically shaped.

* * * * *

UNITED STATES PATENT AND TRADEMARK OFFICE
CERTIFICATE OF CORRECTION

PATENT NO.   :   5,209,773

DATED        :   May 11, 1993

INVENTOR(S)  :   Costandi A. Audeh and Garry W. Kirker

It is certified that error appears in the above-identified patent and that said Letters Patent is hereby corrected as shown below:

On the title page, item (75):

Inventors  Costandi A."Audhe"s/b --Audeh--

"Gray"W. Kirker s/b --Garry--

Signed and Sealed this

Twenty-first Day of December, 1993

Attest:

BRUCE LEHMAN

Attesting Officer     Commissioner of Patents and Trademarks